(12) United States Patent
Stockrahm et al.

(10) Patent No.: US 10,683,042 B2
(45) Date of Patent: Jun. 16, 2020

(54) TRANSPORT TRAILER WITH A CHASSIS AND AT LEAST ONE FLOOR PLATFORM

(71) Applicant: Jungheinrich Aktiengesellschaft, Hamburg (DE)

(72) Inventors: Hauke Stockrahm, Lüneburg (DE); Ralf Hak, Hamburg (DE); Jan-Christian Mensing, Adendorf (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 98 days.

(21) Appl. No.: 15/820,945

(22) Filed: Nov. 22, 2017

(65) Prior Publication Data

US 2018/0154949 A1    Jun. 7, 2018

(30) Foreign Application Priority Data

Nov. 24, 2016    (DE) .................. 10 2016 122 683

(51) Int. Cl.
| | |
|---|---|
| *B62D 33/02* | (2006.01) |
| *B62D 13/00* | (2006.01) |
| *B62D 53/06* | (2006.01) |
| *B62D 33/033* | (2006.01) |
| *B62D 25/20* | (2006.01) |
| *B62D 53/00* | (2006.01) |
| *B62D 7/15* | (2006.01) |

(52) U.S. Cl.
CPC ....... *B62D 33/0207* (2013.01); *B62D 13/005* (2013.01); *B62D 25/2054* (2013.01); *B62D 33/033* (2013.01); *B62D 53/005* (2013.01); *B62D 53/062* (2013.01); *B62D 7/1572* (2013.01)

(58) Field of Classification Search
CPC .............. B62D 33/0207; B62D 13/005; B62D 25/2054; B62D 33/033
See application file for complete search history.

(56) References Cited

U.S. PATENT DOCUMENTS

| | | | | |
|---|---|---|---|---|
| 3,887,207 A | * | 6/1975 | Gotsch, Jr. ................ | B62B 3/10 280/33.998 |
| 4,127,202 A | * | 11/1978 | Jennings ................ | B60D 1/173 280/408 |
| 4,898,419 A | * | 2/1990 | Kenmochi ............. | B62D 21/10 296/191 |

(Continued)

FOREIGN PATENT DOCUMENTS

| | | |
|---|---|---|
| CN | 105501278 A | 4/2016 |
| DE | 202007002437 U1 | 4/2007 |

(Continued)

OTHER PUBLICATIONS

EP 17203062; filed Nov. 22, 2017; European Search Report dated Apr. 24, 2018; 3 pages.

*Primary Examiner* — Joseph M Rocca
*Assistant Examiner* — Michael R Stabley
(74) *Attorney, Agent, or Firm* — Barclay Damon LLP

(57) ABSTRACT

A transport trailer having a chassis and at least one floor platform mounting to the chassis and configured to transport a load. The at least one floor platform comprises at least one main plate and a metal sheet mounting to the main plate. The at least one main plate is fabricated from a porous metal material.

20 Claims, 4 Drawing Sheets

(56) References Cited

U.S. PATENT DOCUMENTS

| | | | |
|---|---|---|---|
| 5,002,333 A * | 3/1991 | Kenmochi | B62D 21/10 296/204 |
| 5,849,122 A * | 12/1998 | Kenmochi | B60R 13/0815 156/182 |
| 6,149,226 A | 11/2000 | Hoelzel et al. | |
| 6,866,463 B2 * | 3/2005 | Riordan | B62B 3/04 280/79.3 |
| 6,974,140 B2 * | 12/2005 | Neuman | B62B 3/02 280/79.11 |
| 8,302,975 B2 * | 11/2012 | Hergeth | B62B 3/04 280/47.19 |
| 8,590,921 B2 * | 11/2013 | Benson | B62B 3/008 182/123 |
| 9,211,900 B2 * | 12/2015 | Knepp | B62B 3/08 |
| 9,290,214 B2 * | 3/2016 | Badura | B62D 53/00 |
| 10,077,158 B2 * | 9/2018 | Lee | B62D 65/18 |
| 2003/0110882 A1 * | 6/2003 | Derrick | B22F 3/1112 74/552 |
| 2011/0111206 A1 | 5/2011 | Verhaeghe | |
| 2012/0298657 A1 | 11/2012 | Wessels et al. | |
| 2015/0344086 A1 * | 12/2015 | Scarth | B62D 63/08 280/411.1 |
| 2017/0021754 A1 * | 1/2017 | Berghammer | B60P 1/43 |

FOREIGN PATENT DOCUMENTS

| | | |
|---|---|---|
| DE | 102011007943 A1 | 5/2012 |
| EP | 0900713 A1 | 3/1999 |
| EP | 0930221 A2 | 7/1999 |
| EP | 1862380 A1 | 12/2007 |
| EP | 1792027 B1 | 8/2016 |

* cited by examiner

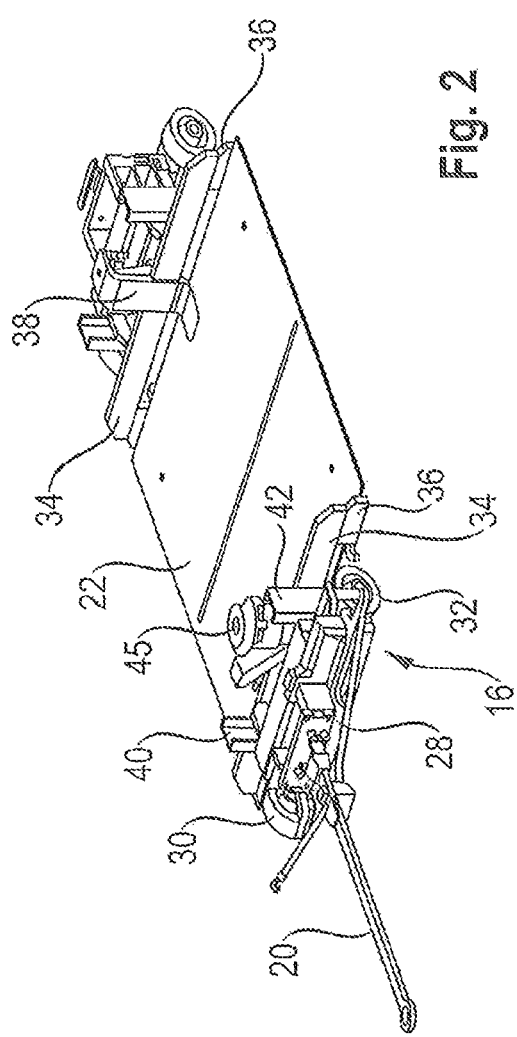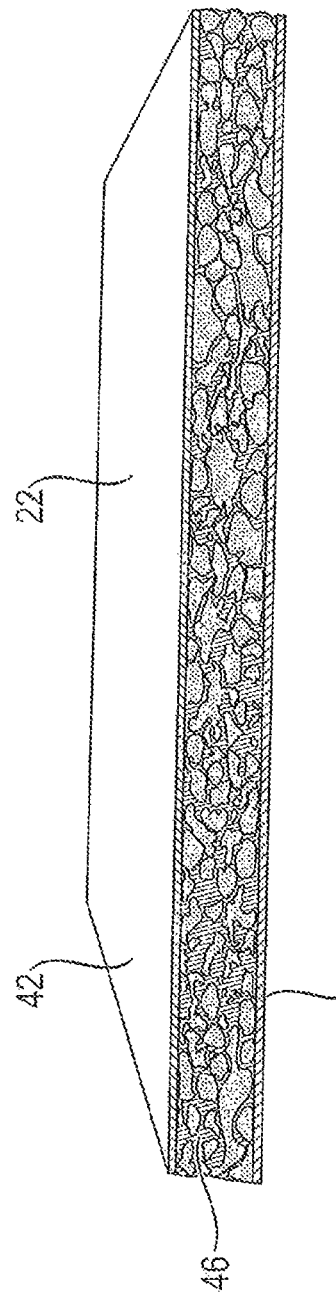

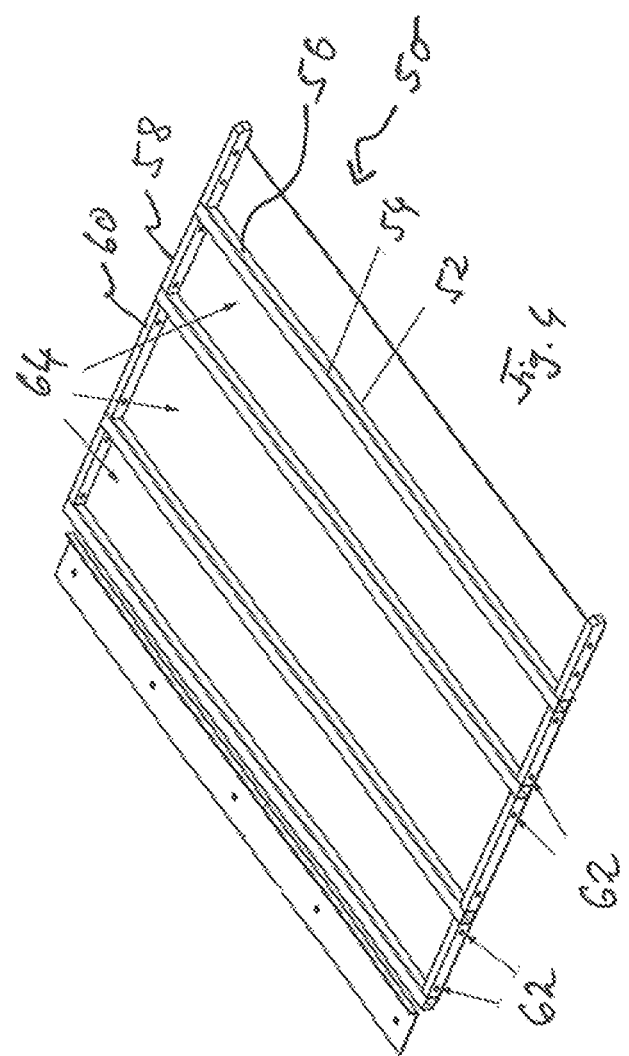

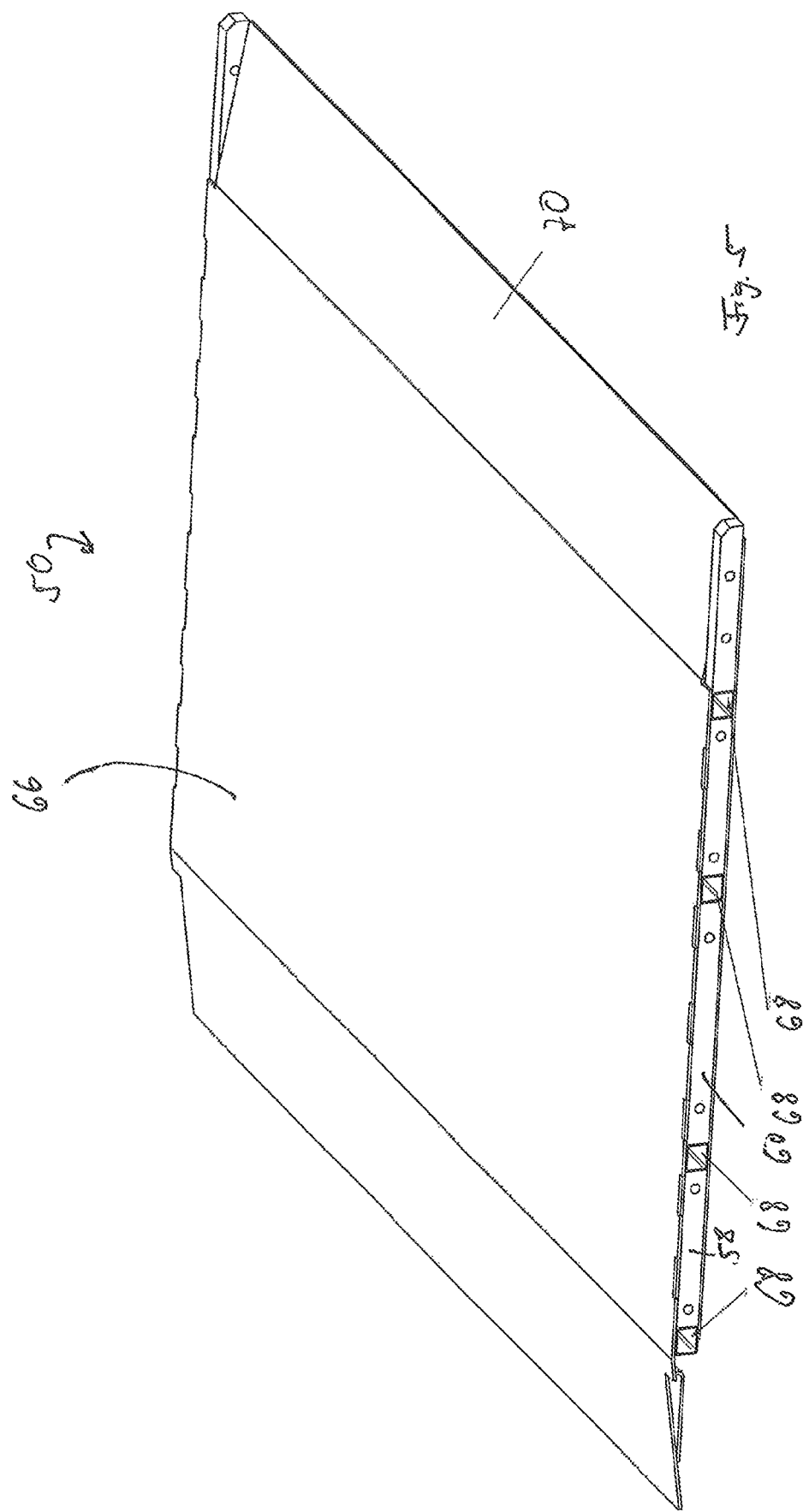

TRANSPORT TRAILER WITH A CHASSIS AND AT LEAST ONE FLOOR PLATFORM

CROSS REFERENCE TO RELATED INVENTION

This application is based upon and claims priority to, under relevant sections of 35 U.S.C. § 119, German Patent Application No. 10 2016 122 683.1, filed Nov. 24, 2016, the entire contents of which are hereby incorporated by reference.

BACKGROUND

Transport trailers play an important role in intra-enterprise logistics. Multiple transport trailers are combined to form a tow train which is pulled through a warehouse or a production area by a towing vehicle. The tow train is occasionally also referred to as a "tugger train" if a route is defined for the tow train, said route being traveled, for example, in a fixed cycle or rotation. Inner carriages are generally provided for the transport of material, parts and products; these are equipped with rollers to enable movement of the material. The inner carriages can be pushed manually, for example; pallets can be arranged on a flat inner carriage.

Numerous different transport trailers are known for transporting the inner carriage. Firstly, transport trailers which can be loaded with an inner carriage from both sides are generally portal trailers wherein a portal is provided which straddles the loading space for the inner carriage. Other transport trailers, such as an E-frame or C-frame, can only be loaded with the inner carriage from one side. Another important distinguishing feature for a transport trailer is whether it can guide the trailer so that the inner carriage remains with its wheels in contact with the floor, or whether it transports the inner carriage so that the wheels of the inner carriage do not contact the floor. In the latter variant, a distinction can be made between transport trailers which actively lift the inner carriage and those which require that the inner carriage be manually pushed manually into the freight space and raised via a ramp.

A trailer vehicle is known from DE 10 2011 007 943 B4, which is constructed for coupling to a towing vehicle. The trailer vehicle has a front and rear axle designed in each case as a steering axle with a steering system having a front axle which executes steering independently and the rear axle is coupled to the front axle. The trailer vehicle includes a loading space between the front and rear axle, wherein a floor plate situated in close proximity to the ground. Furthermore, a portal arch is provided, which transfers tractive forces affecting the front and rear axle together with the floor platform. A disadvantageous associated with this trailer vehicle relates to the significant effort required to urge the inner carriage onto the floor platform.

A reinforced sandwich plate is known from EP 1 792 027 B1, wherein a foamed metal material is provided as a core for a sandwich structure which is additionally reinforced by fibrous reinforcing material. It is suggested that the reinforced sandwich structure be provided as a floor structure for a trailer, a bridge deck, a roof construction, a parking level, an aircraft wing or another structural component.

BRIEF SUMMARY OF THE INVENTION

The present invention is directed to a transport trailer having a chassis and at least one floor platform mounted to the chassis and configured to transport a load. The at least one floor platform comprises at least one main plate and a metal sheet mounting to the main plate. The at least one main plate is fabricated from a porous metal material.

In one embodiment the transport trailer is configured to facilitate the loading and unloading of such that a load, e.g., a rolling inner carriage, may be easily placed onto the floor platform for transport The inventive transport trailer includes a chassis and at least one floor platform upon which at least one inner carriage may be placed on the floor platform with relative ease, i.e., with minimum effort. According to the invention, the floor plate comprises a main plate fabricated from a porous metal material and a metal sheet connected to the main plate. The inventive floor platform offers the advantages of high rigidity and low weight. The invention is takes into consideration the fact that floor platforms must accommodate an inner carriage together with its load while, at the same time, providing sufficient clearance/height so that, when the floor platform sags under the weight of the inner carriage, adequate clearance, or sufficient height, is provided between the floor and the floor platform of the transport trailer. It will be appreciated that the requirement for high ground clearance of the transport trailer in an unloaded condition creates difficulty when loading and unloading a fully loaded inner carriage. That is, significant effort is required to push the fully loaded inner carriage onto the floor platform of the transport trailer. High rigidity is achieved with the inventive floor platform, particularly by the use of a porous metal material. As a result, a low ground clearance can be maintained which facilitates the ease with which a fully loaded inner carriage may be loaded onto the floor platform of the transport trailer. Furthermore, the inventive floor platform contemplated/envisaged is lower in weight than conventional floor platforms with additional reinforcing structure/brackets/braces, which makes the transport trailer altogether lighter and easier to handle.

In another embodiment, a four-wheeled vehicle is provided with a front and rear trailer section. The floor platform is provided between the front and the rear trailer section, with the front and rear trailer section also being connected to one another with at least one portal arch.

In one embodiment at least one ramp element is pivotably mounted to the chassis about a longitudinal trailer axis. In an up position, the ramp element(s) secures the load within the confines of the floor platform, i.e., laterally between the forward and aft rolling trailer sections. In a down position, the ramp element(s) form an access ramp for the floor platform. The ramp element, as well as the floor platform, can be fabricated from a porous metal material in conjunction with a cover plate.

In another embodiment, the floor platform has two metal sheets connected to the main plate, the main plate being situated between the metal sheets. In this embodiment, the floor platform forms a sandwich structure wherein the porous metal material is situated between a pair of metal sheets. For reasons of stability, the main plate is fabricated from a closed-cell foam and in one embodiment, a closed-cell aluminum foam.

In another embodiment, the metal sheet(s) completely covers a flat side of the main plate. A smooth surface is created by complete coverage of the main plate with its porous filler material.

The thickness contemplated or envisaged for the floor platform depends on the maximum load which can be supported by the floor platform. In this regard, it was determined that a thickness of less than 70 mm is sufficient for reacting typical loads. In other embodiments a thickness of less than 60 mm, and in yet other embodiments, a thickness less than 50 mm is sufficient for accommodating conventional loads. A typical maximum load for such trailer may be on the order of between 1,000 kg to about 1,500 kg.

The floor platform in the inventive transport trailer has one or more electrical and/or hydraulic power lines, which have connections on the sides of the floor platform facing the trailer sections. Lines or channels in the main plate may be formed within the porous metal material. The power lines can, for example, be electrical or hydraulic lines which may be molded or formed in place, i.e., into the porous metal material of the main plate of the floor platform. A simple channel may receive a power line through the main plate, i.e., to receive or accommodate electrical or hydraulic lines. In a further embodiment, one or more channels of the floor plate may be provided at the ends or at a side of the floor platform facing the trailer sections. These channels may accommodate one or both of the electrical or hydraulic power lines. It is also possible to make a mechanical coupling through these channels, for example with cables, rods, chains or the like.

One of advantage of the power lines being integrated within the floor platform, or within the channels thereof, relates to the protection provided by such construction. That is, the floor platform protects the power lines from being inadvertently damaged while, at the same time, protecting operators from injury, i.e., by placing the power lines, in a protected manner, within the floor platform.

In a yet another embodiment, the main plate includes a frame constructed from various sections connected to one another. The sections can extend, for example, in the longitudinal and transverse direction of the transport trailer. In the context used herein, the longitudinal direction is the direction from one trailer section to another trailer section, i.e., between the trailer sections. The sections extending in the longitudinal direction, i.e., between the trailer sections, may be hollow sections. In the described embodiment, the transverse sections may be situated between two hollow sections, and form a frame together with the hollow sections in the longitudinal direction. The sections extending in the longitudinal direction may form a channel in each case, wherein electrical and/or hydraulic power lines can be run between the trailer sections.

In one embodiment, the frame of the main plate may be connected with the metal sheet of the main plate, such that the sections of the frame delimit multiple areas on the metal sheet. These areas may be filled with the porous metal material and may additionally be foam packed. This results in a particularly intimate connection between the porous metal material and the frame or metal sheet of the main plate respectively. The frame is preferably covered on both sides by a metal sheet in each case, between which the sections and the foamed metal material may be found.

In another embodiment, the chassis may be designed with four-wheel steering. In this embodiment, the wheels are mounted in a steerable manner on both trailer sections, with steering on the front trailer section and the rear trailer section being coupled with one another via a power line and/or the channels. The coupled four-wheel steering ensures sufficient path stability for the towed transport trailer, particularly if multiple transport trailers are combined in a tow train.

BRIEF DESCRIPTION OF THE DRAWINGS

FIG. 2 is a partially broken-away, perspective view of the chassis to reveal a lifting mechanism disposed between the chassis and the floor platform.

FIG. 3 is a sectional view through the floor platform depicting a porous metal material disposed between a pair of metal sheets.

FIG. 4 is a perspective bottom view of an underside of the main plate including a reinforcing frame.

FIG. 5 is a perspective top view of the main plate having a plurality of hollow cable channels for routing electrical and hydraulic lines through the main plate in a longitudinal direction.

DETAILED DESCRIPTION OF THE INVENTION

Figure 1:
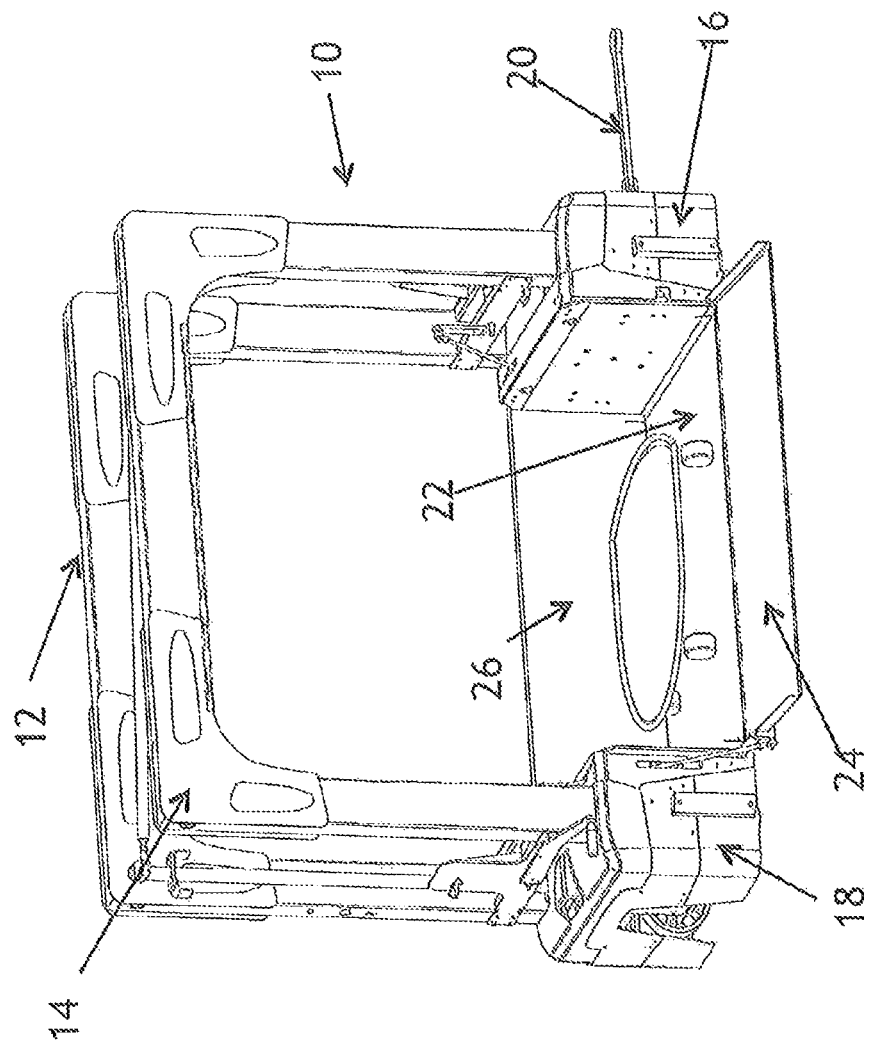
FIG. 1 is a perspective view of a transport trailer according to one embodiment including a floor platform, a metal sheet attached to the floor platform and a ramp element pivotably folded down.

FIGS. 1 and 2 shows a transport trailer 10 having two U-shaped portal arms 12, 14. The portal arms 12, 14 connect a front trailer section 16 with a rear trailer section 18. The front trailer section 16 has a drawbar 20, while the rear trailer section 18 has a trailer coupling (not shown) for accommodating a towing bar of a towed trailer. A level floor platform 22 is located between the front trailer section 16 and the rear trailer section 18. The floor platform 22 has a flat substrate over the entire loading area between the front trailer section 16 and the rear trailer section 18. No additional sections or support beams are situated between the front and rear trailer section. The transfer of force, or ability to react the forces imposed by a steady load, is achieved via the floor platform 22 and/or by the portal arm or arms. The floor platform 22 is delimited laterally by two ramp elements 24 and 26. The ramp elements 24, 26, furthermore, mount to the floor platform 22, or to the chassis 10, by way of a longitudinally-oriented pivot or hinge. The ramp elements 24, 26 may pivot upwardly to retain a load within or on the floor platform 22 or may pivot downwardly to allow access to the floor platform 22 or removal of the load from the floor platform 22. That is, the ramp elements 24, 26 function to retain loads which are disposed within or on the floor platform 22 while also facilitating the loading and/or removal of the load. In FIG. 4, the ramp element 24 is shown in its folded down position to form an access ramp for an inner carriage (not shown in FIG. 4). The ramp element 26 on the opposite longitudinal side of the transport trailer is shown in its raised or upward position. In this position, the ramp element 26 prevents an inner carriage from rolling down from the floor platform 22.

FIG. 2 depicts the construction of the chassis and the floor platform 22. The front trailer section 16 has a towing bar 20 which is connected to a steering system, (preferably an Ackerman steering system) by means of a coupling rod. The front trailer section 16 has two laterally situated wheels 30, 32. There is a transverse or flange section 34 mounted on the trailer sections 12, 14 in each case. The transverse or flange sections 34 each have angled or L-shaped attachment segments 36 on which the floor platform 22 rests and is connected. In the middle of the vehicle, or along its centerline, is an additional L-shaped attachment section 38 which connects to both the transverse section 34 and the floor platform 22.

A lifting mechanism 44 can also be seen on the front and rear trailer section 16, 18 of FIG. 2. The lifting mechanism 44 has two vertical lift/guide sections 40, 42 between which a lift cylinder 44 may be situated. The lift cylinder 44 raises the floor platform 22, for example via the middle attachment 38, while the vertical lift/guide sections 40, 42 raise the floor platform 22 with the aid of the transverse section 34.

FIG. 3 shows a schematic view of a cross section through the floor platform 22. In one embodiment, the floor platform 22 has at least one metal sheet bonded, or otherwise secured, to a flat side of the floor platform 22. In another embodiment, the porous metal plate is bonded, connected or otherwise secured between a pair of metal sheets 42, 44. That is, the metal sheets 42, 44 are disposed in combination with the opposite flat sides of the porous metal material 46. Moreover, the metal sheets 42 and 44 may be comprised of aluminum or steel. The porous metal material 46 may, for example, be fabricated from a closed-cell aluminum foam.

Practical tests have shown that a load of 1000 kg can be supported by a floor platform having a surface area of 1300 mm×1100 mm with a compact design and a thickness dimension of less than about 50 mm. By comparison, a platform made of steel having a thickness dimension of 55 mm can only support a load of about 300 kg.

In FIG. 4, a main plate 50 includes a metal sheet 52 on having a frame 54 attached to the metal sheet 52. The frame 54 comprises four longitudinal sections 56 arranged parallel to one another, which sections 56 are connected by transverse sections 58, 60. The transverse sections 58, 60 are disposed at the end of the metal sheet 52 with the transverse sections 58, 60 having boreholes 62 for attaching the metal sheet 52 and the longitudinal sections 56. Areas 64 are formed between the longitudinal sections 56 and are delimited rectangularly by a longitudinal section on each side and by a transverse section at each end, i.e., at the head and foot of each rectangular area. Each of the areas 64 is delimited on a flat side 52 by the floor of the metal sheet 52 and may be foam-packed with the porous metal material. The second metal sheet may be attached to and completely sealed to the frame 54 such that the porous metal foam material may be introduced into each of the areas 64.

FIG. 5 shows the finished main plate 50 along with a cover metal sheet 66 on the top side. Cable routing channels 68 may be formed by the longitudinal sections 56. Furthermore, tamp-shaped ascension aids 70 may be provided laterally of the cover metal sheet 66.

The invention claimed is:

1. A transport trailer comprising:
a chassis;
at least one floor platform mounted to the chassis, the at least one floor platform configured to transport a load and comprising at least one main plate and at least one metal sheet mounted to a side of the at least one main plate, the at least one main plate fabricated from a porous metal material; and
one of an electrical and a hydraulic power line integrated within the at least one floor platform, each of the electrical and hydraulic power lines having a connection on a side of the at least one floor platform facing a trailer section.

2. The transport trailer of claim 1, wherein the chassis has a front and rear trailer section.

3. The transport trailer of claim 1, further comprising at least one ramp element pivotably mounted to the chassis about a longitudinal axis, the at least one ramp element pivoting from a raised position to a lowered position, wherein the raised position retains the load on the at least one floor platform, and wherein the lowered position permits loading and unloading of the load to and from the at least one floor platform.

4. The transport trailer of claim 1, wherein the at least one main plate is situated between a pair of metal sheets.

5. The transport trailer of claim 1, wherein the porous metal material is a closed-cell aluminum foam.

6. The transport trailer of claim 1, wherein the at least one metal sheet completely covers a flat side of the at least one main plate.

7. The transport trailer of claim 1, wherein the at least one metal sheet is fabricated from one of a steel material and an aluminum material.

8. The transport trailer of claim 1, wherein the at least one main plate has a thickness less than about seventy millimeters (70 mm).

9. The transport trailer of claim 8, wherein the at least one main plate has a thickness less than about sixty millimeters (60 mm).

10. The transport trailer of claim 9, wherein the at least one main plate has a thickness less than about fifty millimeters (50 mm).

11. The transport trailer of claim 1, further comprising at least one channel integrated with the at least one floor platform, the at least one channel having an end facing a trailer section.

12. The transport trailer of claim 1, wherein the at least one main plate is segmented to form multiple sections.

13. A transport trailer comprising:
a chassis, and
at least one floor platform mounted to the chassis, the at least one floor platform configured to transport a load and comprising at least one main plate and at least one metal sheet mounted to a side of the at least one main plate, the at least one main plate fabricated from a porous metal material,
wherein the at least one main plate is segmented to form multiple sections, and wherein at least one of the sections extends longitudinally between two adjacent sections and is hollow.

14. The transport trailer of claim 13, wherein the at least one floor platform further comprises a frame connected to the at least one metal sheet, and wherein the frame defines multiple areas for receiving the porous metal material.

15. The transport trailer of claim 13, wherein the at least one floor platform further comprises a frame connected to the at least one metal sheet, and wherein the frame defines multiple areas for receiving packed foam material.

16. The transport trailer of claim 13, wherein the load is an inner carriage having a rolling base.

17. The transport trailer of claim 13, wherein the chassis has a front and rear trailer section.

18. A transport trailer comprising:
a chassis,
at least one floor platform mounted to the chassis, the at least one floor platform configured to transport a load and comprising at least one main plate and at least one metal sheet mounted to a side of the at least one main plate, the at least one main plate fabricated from a porous metal material, and
a power line integrated within the at least one floor platform and having a connection on a side of the at least one floor platform facing a trailer section.

19. The transport trailer of claim 18, wherein the trailer section includes a steerable wheel powered by the power line passing through channels of the at least one floor platform.

20. A transport trailer comprising:
a chassis,
at least one floor platform mounted to the chassis, the at least one floor platform configured to transport a load and comprising at least one main plate and at least one metal sheet mounted to a side of the at least one main plate, the at least one main plate fabricated from a porous metal material, wherein the at least one main plate is segmented to form multiple sections, and wherein at least one of the sections extends longitudinally between two adjacent sections.

\* \* \* \* \*